United States Patent
Jedrzejewski

(10) Patent No.: US 11,418,096 B2
(45) Date of Patent: Aug. 16, 2022

(54) ELECTRIC MACHINE, IN PARTICULAR FOR A MOTOR VEHICLE

(71) Applicant: Bayerische Motoren Werke Aktiengesellschaft, Munich (DE)

(72) Inventor: Darius Jedrzejewski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 487 days.

(21) Appl. No.: 16/664,038

(22) Filed: Oct. 25, 2019

(65) Prior Publication Data

US 2020/0059144 A1    Feb. 20, 2020

Related U.S. Application Data

(63) Continuation of application No. PCT/EP2018/059807, filed on Apr. 18, 2018.

(30) Foreign Application Priority Data

Apr. 26, 2017    (DE) ..................... 10 2017 206 982.1

(51) Int. Cl.
*H02K 16/04*    (2006.01)
*H02K 5/173*    (2006.01)
*H02K 7/00*     (2006.01)
*H02K 7/08*     (2006.01)
*H02K 9/06*     (2006.01)

(52) U.S. Cl.
CPC ........... *H02K 16/04* (2013.01); *H02K 5/1732* (2013.01); *H02K 7/006* (2013.01); *H02K 7/083* (2013.01); *H02K 9/06* (2013.01)

(58) Field of Classification Search
CPC ...... H02K 16/04; H02K 5/1732; H02K 7/006; H02K 7/083; H02K 9/06

USPC ......................................................... 310/90
See application file for complete search history.

(56) References Cited

U.S. PATENT DOCUMENTS

| | | |
|---|---|---|
| 4,945,296 A | 7/1990 | Satake |
| 2016/0036308 A1 | 2/2016 | Bailey et al. |

FOREIGN PATENT DOCUMENTS

| | | |
|---|---|---|
| CN | 87 2 16443 U | 9/1988 |
| CN | 1030854 A | 2/1989 |
| CN | 2266836 Y | 11/1997 |
| DE | 35 12 101 A1 | 10/1986 |
| DE | 37 41 678 A1 | 6/1989 |
| DE | 10 2013 112 625 A1 | 5/2015 |
| EP | 0 299 739 A2 | 1/1989 |

(Continued)

OTHER PUBLICATIONS

International Search Report (PCT/ISA/210) issued in PCT Application No. PCT/EP2018/059807 dated Aug. 1, 2018 with English translation (four (4) pages).

(Continued)

*Primary Examiner* — Terrance L Kenerly
(74) *Attorney, Agent, or Firm* — Crowell & Moring LLP

(57) ABSTRACT

An electric machine has a stator, which has at least one first magnet and at least one second magnet, and a rotor, which can be driven by the magnets and can rotate about an axis of rotation relative to the stator. The first magnet is held on a first ring and the second magnet is held on a second ring following the first ring in the axial direction of the electric machine. The second ring can, together with the second magnet, rotate about the axis of rotation relative to the first ring and the first magnet.

8 Claims, 6 Drawing Sheets

(56) References Cited

FOREIGN PATENT DOCUMENTS

WO  WO 98/01936 A1  1/1998

OTHER PUBLICATIONS

German-language Written Opinion (PCT/ISA/237) issued in PCT Application No. PCT/EP2018/059807 dated Aug. 1, 2018 (six (6) pages).
Chinese-language Office Action issued in Chinese Application No. 201880027373.4 dated Oct. 23, 2020 with English translation (14 pages).

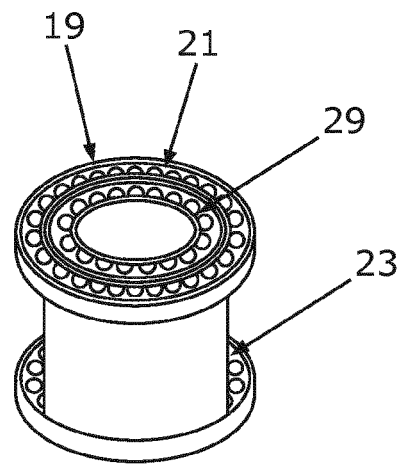
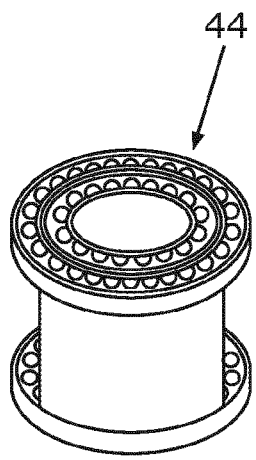
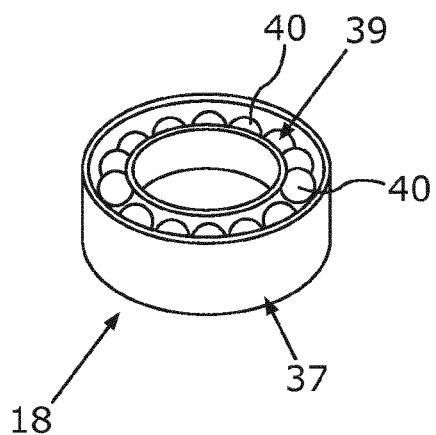
Fig. 9     Fig. 10

ELECTRIC MACHINE, IN PARTICULAR FOR A MOTOR VEHICLE

CROSS REFERENCE TO RELATED APPLICATIONS

This application is a continuation of PCT International Application No. PCT/EP2018/059807, filed Apr. 18, 2018, which claims priority under 35 U.S.C. § 119 from German Patent Application No. 10 2017 206 982.1, filed Apr. 26, 2017, the entire disclosures of which are herein expressly incorporated by reference.

BACKGROUND AND SUMMARY OF THE INVENTION

The invention relates to an electrical machine, specifically for a motor vehicle.

An electrical machine of this type, specifically for a motor vehicle, is already known, for example, from DE 10 2013 112 625 A1. The electrical machine comprises a stator, having at least one first magnet and at least one second magnet. The electrical machine further comprises a rotor, which is drivable by means of the stator, specifically by means of the magnets, and is thus rotatable about an axis of rotation relative to the stator.

The object of the invention is the further development of an electrical machine of the above-mentioned type, such that a particularly advantageous operation of the electrical machine can be achieved.

This object is fulfilled by an electrical machine according to the invention.

The electrical machine according to the invention, specifically for a motor vehicle such as, for example, a motor car, comprises a stator, which has at least one first magnet and at least one second magnet. The electrical machine further comprises a rotor, which is rotatable about an axis of rotation relative to the stator, which can be driven by means of the stator, specifically by means of the magnets, and is thus rotatable about the axis of rotation relative to the stator.

In order to permit the achievement of a particularly advantageous, and specifically an appropriate operation of the electrical machine, it is provided, according to the invention, that the first magnet is held on a first ring, and the second magnet is held on a second ring. The second ring follows the first ring, in the axial direction of the electrical machine. In other words, the rings, in the axial direction of the electrical machine, and thus along the axis of rotation, are arranged one after another, or sequentially. Accordingly, for example, the magnets are also arranged one after another, or sequentially, in the axial direction of the electrical machine. The second ring, together with the second magnet, is rotatable about the axis of rotation relative to the first ring and to the first magnet. In other words, the rings are rotatable relative to one another about the axis of rotation, such that—as the magnets are held or secured on the rings—the magnets are rotatable relative to one another about the axis of rotation. Thus, for example, a clearance between the magnets in the circumferential direction of the electrical machine can be appropriately set, such that a particularly advantageous, and specifically an efficient, effective and appropriate operation of the electrical machine is possible. Again, expressed in other words, the magnets are appropriately positionable relative to one another in the circumferential direction of the electrical machine, as a result of which, for example, a magnetic field creatable by the magnets, specifically the profile thereof, can be influenced in a particularly appropriate manner. As a consequence, an advantageous, efficient and effective operation of the electrical machine can be achieved.

The electrical machine preferably incorporates an actuator, by which the rings, and thus the magnets, are rotatable relative to one another about the axis of rotation. The actuator is preferably configured as an electrically-operatable actuator. Specifically, it is contemplated that at least one of the rings is rotatable about the axis of rotation relative to the rotor and/or relative to a housing, in which the stator and the rotor respectively are at least partially accommodated, whereas, for example, the other ring is non-rotational relative to the housing, and thus cannot be rotated about the axis of rotation relative to the housing. However, it has proved to be particularly advantageous if both rings are rotatable about the axis of rotation relative to the housing and relative to the rotor, as a result of which the magnets can be adjusted with respect to their position in a particularly appropriate manner.

The actuator comprises a first actuating element for example, by which the first ring is rotatable about the axis of rotation relative to the housing. Preferably, the actuator further comprises a second actuating element, by which, for example, the second ring is rotatable about the axis of rotation relative to the housing.

The electrical machine is preferably configured as an internal rotor machine, such that the rotor is at least partially arranged within the stator. The stator thus outwardly overlaps, for example, at least one longitudinal region of the rotor in the radial direction of the electrical machine, such that the magnets are configured, for example, as external magnets.

In an advantageous configuration of the invention, the magnets are respectively configured as electromagnets, as a result of which a particularly advantageous, and specifically an appropriate operation of the electrical machine can be achieved. Specifically, it is contemplated that the electrical machine is operable in a motor mode, and is thus operable as an electric motor. In the motor mode, the electrical machine delivers torques via the rotor, by which, for example, at least one wheel of the motor vehicle is drivable. Alternatively or additionally, the electrical machine can be operated, for example, in a generator mode, and can thus be operated as a generator. In the generator mode, the rotor is driven, for example by the kinetic energy of the moving vehicle such that, by way of the generator, kinetic or mechanical energy is converted into electrical energy, which is delivered by the generator.

It has proved to be particularly advantageous if the electromagnets are electrically actuatable in an individual or separate manner. It is thus possible, for example, for the electromagnets to be actuated independently of one another and/or in a different manner from one another such that, for example, a first electric voltage is applied to one of the electromagnets, and a second electric voltage, which differs from the first electric voltage, is applied to the other electromagnets, and/or such that an electric current of a first current strength flows in a first of the electromagnets, whereas electric current of a second current strength, which differs from the first current strength, flows in the second electromagnet. The electric voltages preferably differ from 0 and/or the electric current strengths differ from 0. Specifically, it is contemplated that one of the electric voltages or one of the electric current strengths differs from 0 whereas, for example, the other electric voltage or the other electric current strength assumes a value of 0. By means of the possibility for the appropriate positioning of the magnets, and for the appropriate or differing electrical actuation thereof, a particularly advantageous speed adjustment, and specifically a speed control of the rotor is possible, for example by means of the magnets which are configured as external magnets. Specifically, an intelligent control of the magnets and the fields thereof can be achieved. The respective field is, for example, a magnetic field created by the respective magnet, the flux of which can be adjusted in an appropriate manner. The number of magnets and the size thereof can be variable, and can be adjusted appropriately.

In a further embodiment of the invention, the electrical machine has at least a first operating state, in which the electromagnets are supplied with alternating current. A particularly advantageous operation can be achieved as a result.

A further embodiment is characterized in that the electrical machine has at least a second operating state, in which the electromagnets are supplied with direct current. Specifically, it is contemplated that, in the second operating state, the direct current flows through the electromagnets in a first direction. A third operating state is further contemplated, in which the electromagnets are supplied with direct current wherein, in a third operating state, the direct current flows through the electromagnets in a second direction, which is in opposition to the first direction. Overall, for example, an exceptionally rapid and advantageous acceleration of the rotor can thus be achieved. Moreover, by a corresponding electrical actuation of the magnets, the rotor can be braked in a particularly rapid, appropriate and targeted manner such that, for example, the overall braking of the vehicle can advantageously be achieved thereafter.

In a further configuration of the invention, a plurality of first magnets are held on the first ring, wherein a plurality of second magnets are held on the second ring. A particularly advantageous, effective and efficient operation of the electrical machine can be achieved as a result.

It has proved to be particularly advantageous if at least three first magnets, held on the first ring, and at least three second magnets, held on the second ring, are provided, wherein the first magnets and/or the second magnets are arranged with an equal mutual spacing in the circumferential direction of the respective ring. This means that pairs of the first or second magnets are arranged with an equal spacing from one another in the circumferential direction of the respective ring. If, for example, exactly three magnets are held on the respective ring, pairs of magnets are arranged with a respective clearance of 120 degrees running in the circumferential direction of the respective ring. In other words, for example, the magnets are arranged with a mutual offset of 120 degrees in relation to one another in the circumferential direction of the respective ring, as a result of which a particularly advantageous operation can be constituted.

In a further configuration of the invention, the rotor comprises at least one shaft which is rotatable about the axis of rotation relative to the stator, and a coil which is at least indirectly connected to the shaft, and is co-rotatable with said shaft, and which can be supplied with electric current. For example, the coil is at least indirectly non-rotationally connected to the shaft. Specifically, it is contemplated that the rotor comprises at least one carrier, which is also described as a carrier element. The carrier is, for example, non-rotationally connected to the shaft, and is thus co-rotatable with the shaft about the axis of rotation. The coil is at least indirectly, and specifically directly, held on the carrier here, for example. The coil, for example, is wound about at least one sub-region of the carrier.

It has proved to be particularly advantageous if the rotor is rotatably mounted on the stator by means of at least one rolling bearing device. The rolling bearing device has a first series of rolling elements, comprising a first rolling element ring with a plurality of first rolling elements arranged sequentially in the circumferential direction of the shaft, a second rolling element ring arranged subsequently to the first rolling element ring in an axial direction of the shaft, having a plurality of second rolling elements arranged sequentially in a circumferential direction of the shaft, and a first bearing ring element. The first bearing ring element forms a first raceway for the first rolling elements and a second raceway for the second rolling elements. This means that the rolling elements, which are configured in a mutually separate manner per se and arranged sequentially in the circumferential direction of the shaft, can roll or rotate in the respectively associated raceway.

The rolling bearing device further comprises a second series of rolling elements, comprising a third rolling element ring, which at least partially inwardly overlaps the first rolling element ring in the radial direction of the shaft, having a plurality of third rolling elements arranged sequentially in the circumferential direction of the shaft, a fourth rolling element ring arranged subsequently to the third rolling element ring in an axial direction of the shaft and at least partially inwardly overlapping the second rolling element ring in the radial direction of the shaft, having a plurality of fourth rolling elements arranged sequentially in a circumferential direction of the shaft, and a second bearing ring element arranged in the radial direction of the shaft between the first bearing ring element and the third rolling elements, and between the first bearing ring element and the fourth rolling elements. The second bearing ring element constitutes a third raceway for the third rolling elements, and a fourth raceway for the fourth rolling elements. As a result, the third rolling elements which are mutually separately configured and arranged sequentially in the circumferential direction of the shaft can roll in the third raceway, and the fourth rolling elements which are mutually separately configured and arranged sequentially in the circumferential direction of the shaft can roll in the fourth raceway, specifically when the shaft or the rotor as a whole is rotated about the axis of rotation, relative to the rotor.

The rolling bearing device further comprises at least one insulating element arranged in the radial direction between the series of rolling elements, specifically between the bearing ring elements, by means of which the series of rolling elements are electrically insulated from one another. In other words, the first series of rolling elements is electrically insulated from the second series of rolling elements by means of the insulating element. Moreover, in at least one operating state of the electrical machine, the coil, also described as the winding, is supplied with electric current such that said electric current flows to the coil via one of the series of rolling elements, and flows from the coil via the other series of rolling elements.

The electric current with which the coil is supplied is delivered, for example, by an energy or current source. In the above-mentioned operating state, electric current delivered by the current source flows, for example, from the current source via the one series of rolling elements to the coil, and through said coil. Thereafter, for example, the electric current flows out of the coil, and here from the coil via the other series of rolling elements to the current source, or to the ground of the electrical machines as a result of which, for example, an electric circuit is closed. Specifically, it is contemplated that the infeed of electric current, for example to the coil, is delivered via the above-mentioned carrier and/or that electric current flows out of the coil via the carrier.

By means of this supply of electric current to the coil, a particularly simple, space-saving, weight-saving, efficient and effective electric current supply is ensured, such that a particularly advantageous operation of the electrical machine can be achieved.

In order to achieve the supply of electric current to the coil in a particularly advantageous manner, and thus permit the achievement of a particularly advantageous operation of the electrical machine, in a further embodiment of the invention, it is provided that the first rolling element ring and the third rolling element ring are arranged in a first longitudinal region of the rolling bearing device, wherein the first longitudinal region is configured in an overlap-free outward arrangement, in the radial direction, to the coil and/or to the carrier which is non-rotationally connected to the shaft, on which the coil is mounted. Thus, the first rolling element ring and the second rolling element ring, in the outward radial direction, are not overlapped by the coil or by the carrier.

The second rolling element ring and the fourth rolling element ring, for example, are arranged in a second longitudinal region of the rolling bearing device, which is arranged in an axial direction of the shaft subsequently to the first longitudinal region, wherein the second longitudinal region, in the outward radial direction, is overlapped by the coil and/or by the carrier.

In order to achieve a particularly advantageous electric current supply, it is provided, in a further configuration of the invention, that the rotor is rotatably mounted on the stator by means of at least one second rolling bearing device, arranged in the axial direction of the shaft subsequently to the rolling bearing device and spaced from said rolling bearing device. The second rolling bearing device comprises a third series of rolling elements, having a fifth rolling element ring with a plurality of fifth rolling elements which are arranged sequentially in a circumferential direction of the shaft, wherein, in the at least one operating state of the electrical machine, the coil is supplied with electric current in such a way that the electric current flows to or from the coil via the third series of rolling elements.

Finally, it has proved to be particularly advantageous if, in at least one operating state of the electrical machine, the coil is supplied with electric current in such a way that the electric current flows to or from the coil via the shaft. Thus, at least one longitudinal region of the shaft is also employed for the supply of electric current to the shaft, thus permitting a particular restriction of the number of parts, the weight and the space requirement. As a consequence, a particularly advantageous, and specifically an effective and efficient operation of the electrical machine can be constituted.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 9 is a schematic perspective view of a rolling bearing of the electrical machine according to the first embodiment.

FIG. 10 is a sectional schematic perspective view of a rolling bearing which is employed for the electrical machine according to the second embodiment and according to the third embodiment.

In the figures, identical or functionally equivalent elements are identified by the same reference numbers.

DETAILED DESCRIPTION OF THE DRAWINGS

Figure 1:
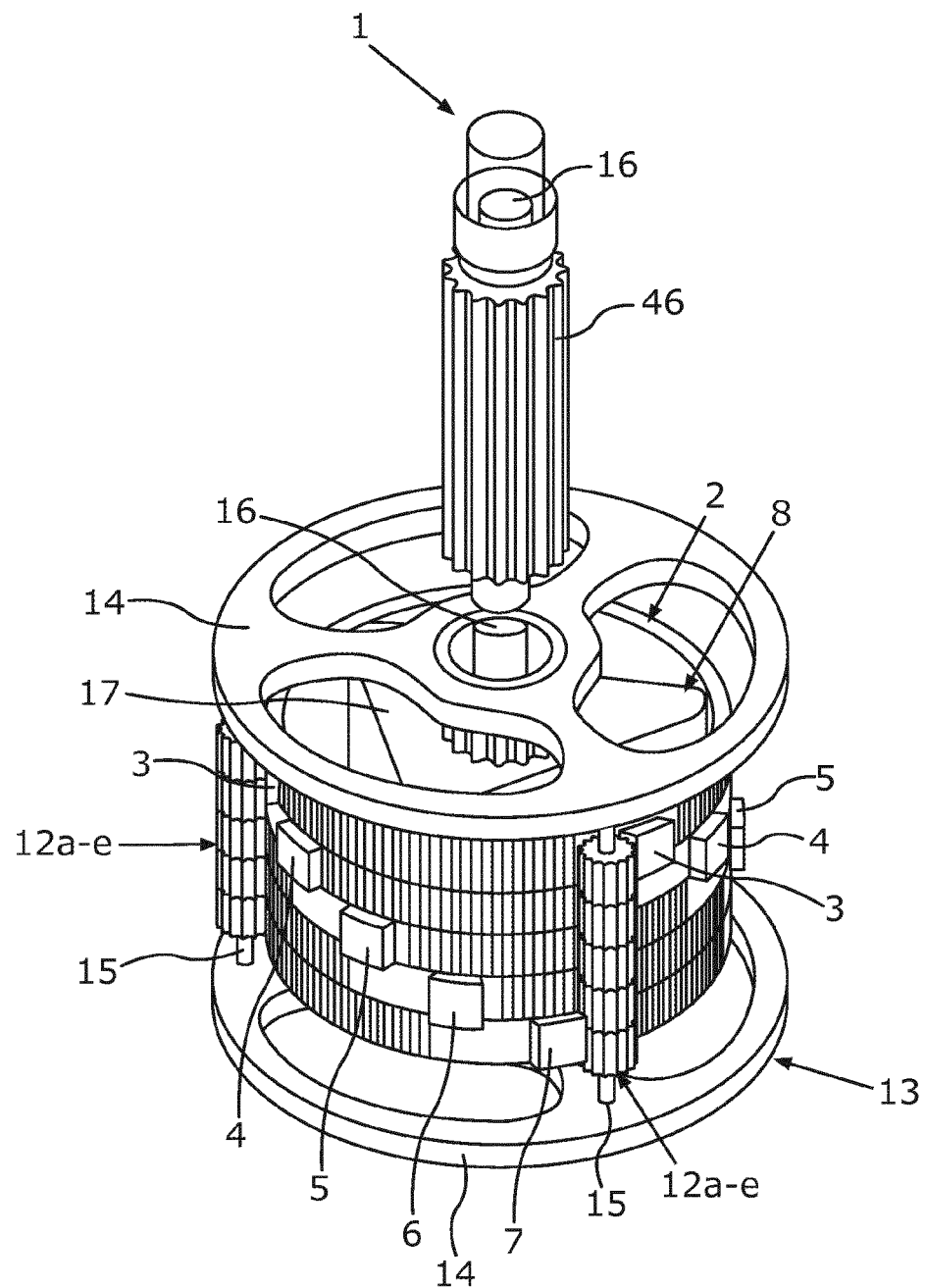
FIG. 1 is a schematic perspective view of an electrical machine according to a first embodiment of the invention, having a stator and a rotor which is rotatable about an axis of rotation relative to the stator, wherein the stator comprises a plurality of rings arranged sequentially in the axial direction of the electrical machine, on each of which a plurality of magnets are held, and wherein the rings, with the respective magnets, are rotatable relative to one another about the axis of rotation.

FIG. 1 shows a schematic perspective view of a first embodiment of an electrical machine, identified as a whole by the number 1, which can be employed, for example, in a drive train of a motor vehicle, specifically of a motor car such as, for example, a private car. Specifically, the electrical machine 1 can be employed as a traction machine, by means of which at least one wheel of the motor vehicle, and thus specifically the motor vehicle as a whole, can be electrically driven. To this end, for example, the electrical machine 1 is operable in a motor mode, and is thus operable as an electric motor. Alternatively or additionally, the electrical machine 1 can be operated in a generator mode, and thus as a generator.

The electrical machine 1 comprises a stator 2. The stator 2 incorporates a plurality of first magnets 3, a plurality of second magnets 4, a plurality of third magnets 5, a plurality of fourth magnets 6, and a plurality of fifth magnets 7. The electrical machine 1 further incorporates a rotor 8, which can be particularly clearly seen in FIG. 2, and which is rotatable about an axis of rotation relative to the stator 2. The rotor 8 is drivable by way of the magnets 3, 4, 5, 6 and 7, and thus by the stator 2, and is thus rotatable about the axis of rotation. In conjunction with FIG. 5, it can be seen that the stator 2 and the rotor 8 respectively, at least partially, and specifically at least predominantly or entirely, are accommodated in a housing 9, which is also described as a shell, such that the stator 2 and the rotor 8, in the radial direction of the electrical machine 1, are respectively externally overlapped at least partially, and specifically at least predominantly or entirely, by the housing 9. The rotor 8 is rotatable about the axis of rotation relative to the housing 9.

In order now to permit the achievement of a particularly advantageous, and specifically an appropriate operation of the electrical machine 1, the rotor 8 comprises a plurality of rings 10a-e, arranged sequentially or one after another in an axial direction, wherein ring 10a is assigned to the first magnets 3, ring 10b is assigned to the second magnets 4, ring 10c is assigned to the third magnets 5, ring 10d is assigned to the fourth magnets 6, and ring 10e is assigned to the fifth magnets 7. The magnets 3 are held or secured on the first ring 10a, whereas the magnets 4 are held or secured on ring 10b, the magnets 5 on ring 10c, the magnets 6 on ring 10d, and the magnets 7 on ring 10e. The respective ring 10a-e is rotatable, together with the respective magnets 3, 4, 5, 6 and 7 which are held on the respective ring 10a-e, about the axis of rotation relative to the housing 9, such that the rings 10a-e, together with the magnets 3, 4, 5, 6 and 7, are rotatable relative to one another about the axis of rotation about the axis of rotation.

Figure 2:
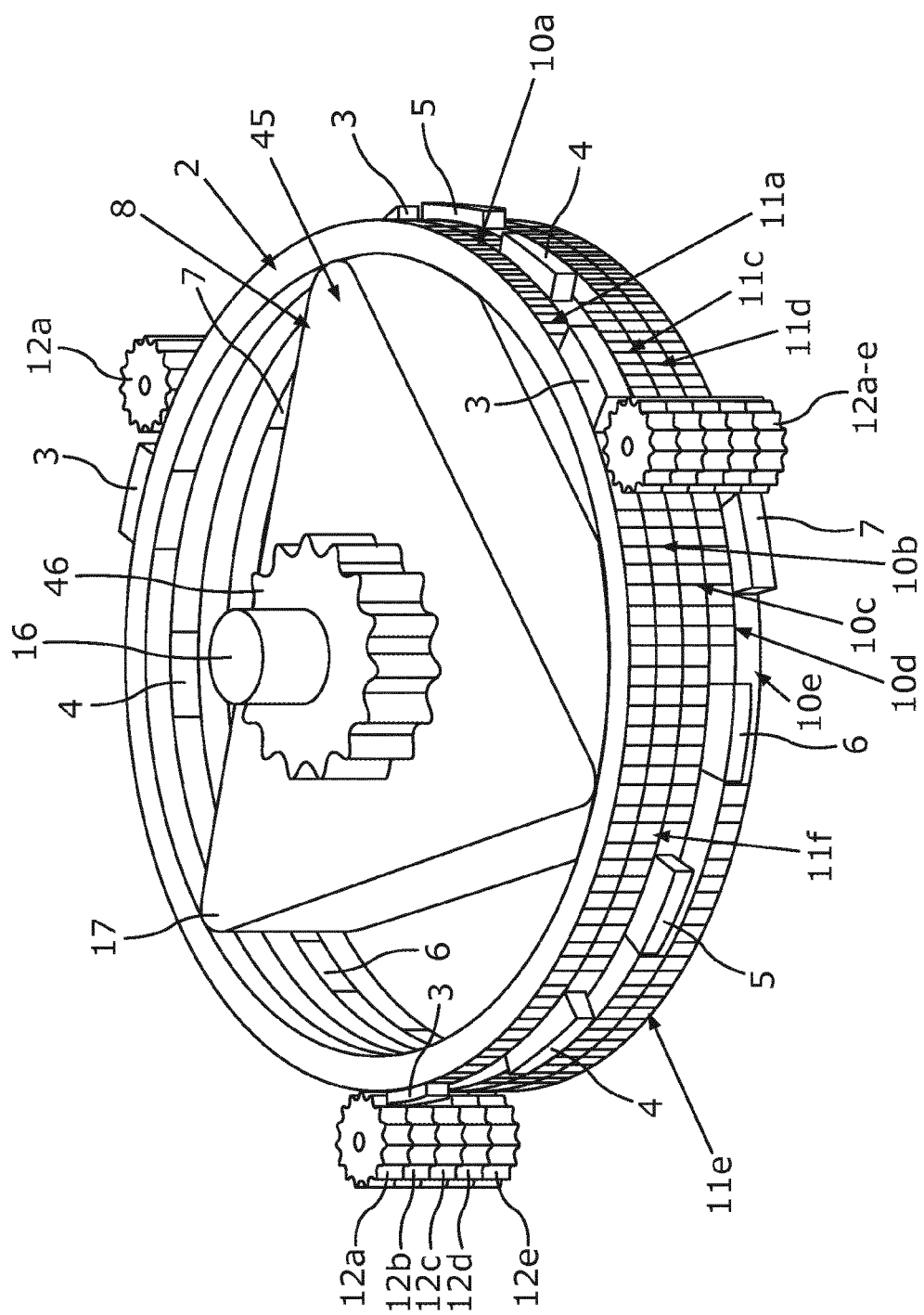
FIG. 2 is a sectional schematic perspective of the electrical machine according to the first embodiment.

From FIG. 2, it can be particularly clearly seen that the respective magnets 3, 4, 5, 6 and 7 are arranged radially, i.e. in the circumferential direction of the respective ring 10a-e, sequentially or one after another, and are thus mutually spaced. It is preferably provided that the respective magnets 3, 4, 5, 6 and 7 are evenly distributed in the circumferential direction of the respective ring 10a-e, such that pairs of the magnets 3, 4, 5, 6 and 7 are arranged with an equal mutual spacing in the circumferential direction of the respective ring 10a-d, about the axis of rotation. If, for example, the number of magnets 3, 4, 5, 6 and 7 is exactly three, the respective magnets 3, 4, 5, 6 and 7, for example, are arranged at an angle of 120 degrees to one another, specifically in the circumferential direction of the respective ring 10a-e, such that all three magnets 3, 4, 5, 6 and 7 have the same mutual spacing. The above-mentioned circumferential direction coincides with a direction of rotation, in which the rotor 8 rotates relative to the stator 2 during at least one operation of the electrical machine 1.

It is further preferably provided that the magnets 3, 4, 5, 6 and 7 are respectively configured as electromagnets, and are thus individually or separately electrically actuatable. In other words, the electromagnets can be arranged, for example, as a block, or with an individual offset, and can be individually electrically actuated, such that a particularly appropriate operation of the electrical machine 1 is contemplated. Specifically, it is contemplated to supply at least the electromagnets held on one of the rings 10a-e with electrical energy or electric current, whereas at least the electromagnets held on one of the other rings 10a-e are not supplied with electrical energy or electric current. In other words, it is thus contemplated to be supplied with at least one of the electromagnets with electrical energy, whereas at least one other of the electromagnets is switched-off, and is consequently not supplied with electrical energy. As a result, a particularly rapid start-up can be achieved, for example, such that the rotor 8 can be brought to a particularly high speed in a particularly rapid manner. If the rotor 8 assumes this speed, a particularly efficient operation of the electrical machine 1 can be achieved, wherein the rotor 8 can be maintained at the above-mentioned speed in an energy-efficient manner.

Preferably, a dedicated current source is assigned to each of the electromagnets, such that each of the electromagnets can be actuated individually, but also as a block with other electromagnets.

From FIG. 2, it can be particularly clearly seen that the rotatability of the respective ring 10a-e is achieved in that the respective ring 10a-e comprises a toothing 11a-e, which is preferably configured as an external toothing. For example, for each toothing 11a-e, a pinion 12a-e is provided, wherein the respective pinion 12a-e engages with the respectively associated toothing 11a-e. In the first embodiment, for each toothing 11a-e, and thus for each ring 10a-e, three pinions 12a-e are provided. The respective pinion 12a-e is rotatable about a second axis of rotation, also described as the secondary axis of rotation, specifically relative to the housing 9, wherein the secondary axis of rotation, in the radial direction of the electrical machine 1, is spaced or axially offset from the first axis of rotation, also described as the primary axis of rotation. If the respective pinion 12a-e is rotated about the secondary axis of rotation relative to the housing 9, the engagement of the respective pinion 12a-e with the respectively associated toothing 11a-e is such that the respective ring 10a-e rotates about the primary axis of rotation relative to the housing 9.

For example, a specifically electrically operable actuator is provided, which is not represented in the figure, by means of which, for example, the respective pinions 12a-e can be rotated in an individual, separate or independent manner relative to one another. It is thus contemplated, for example, that the pinions 12a-e can be rotated about the respective secondary axis of rotation relative to one another. As a result, for example, at least one of the rings 10a-e can be rotated about the primary axis of rotation, whereas at least one of the other rings 10a-e is not rotated about the primary axis of rotation.

From FIG. 1, it can be seen that a frame 13 is provided, which incorporates bearing disks 14. The bearing disks 14 are arranged with a mutual spacing in the axial direction of the electrical machine 1, and are mutually interconnected by means of bearing shafts 15 of the frame 13. The pinions 12a-e are rotatably mounted about the bearing shafts 15, and can thus be rotated about the respective secondary axis of rotation relative to the respective bearing shaft 15. From FIG. 5 it can be seen that the bearing shafts 15 and the pinions 12a-e are preferably arranged in the housing 9, and are consequently outwardly overlapped by the housing 9 in the radial direction.

Figure 5:
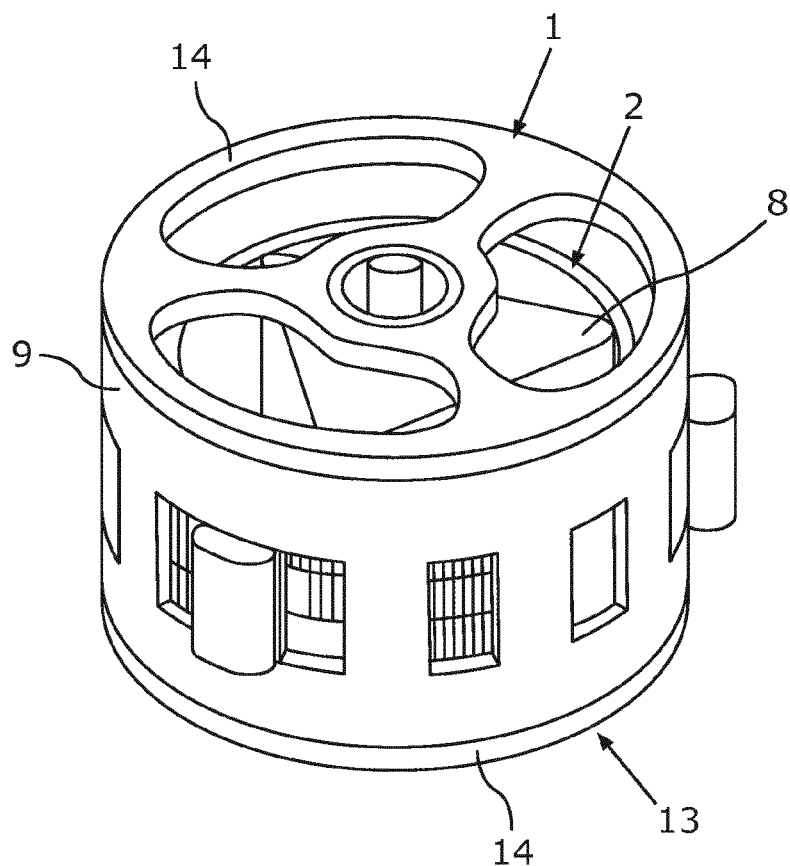
FIG. 5 is a further schematic perspective view of the electrical machine.

Moreover, from FIGS. 1 and 5 it can be particularly clearly seen that the electrical machine 1 is configured as an internal rotor machine. This means that the rotor 8, at least partially, and specifically at least predominantly is arranged within the stator 2, such that the rotor 8, in the radial direction of the electrical machine 1 is at least partially, and specifically is at least predominantly or entirely outwardly overlapped by the stator 2. The magnets 3, 4, 5, 6 and 7 are thus configured as external magnets. By means of these external magnets, and specifically by means of the option for the individual electrical actuation of the external magnets and for the rotation thereof about the primary axis of rotation relative to the housing 9 and relative to each other, the speed of the rotor 8 can be set in a particularly advantageous manner, and specifically can be controlled or regulated. Specifically, pulse control is possible. Preferably, a plurality of current sources are employed for the individual supply of electrical energy to each external magnet, and/or for the current-controllable connection thereof to at least one respective semiconductor, or for the execution of impulse control.

For example, for the start-up of the electrical machine 1, the start-up of which is described as a motor start-up, the external magnets are, for example, chronologically or evenly distributed about the rotor 8, in order to permit the achievement of the greatest possible force or a greatest possible torque for the start-up, and specifically for the acceleration of the rotor 8. Thereafter, the position of the external magnets is, for example, adjusted such that the external magnets form, for example, a row which runs perpendicularly or parallel to the axial direction or to the primary axis of rotation. By means of the variability of the external magnets, specifically with respect to their positioning in the circumferential direction of the electrical machine, and with respect to the supply thereof with electrical energy or electric current, a plurality of different mechanical magnet configurations and magnet positions is achievable, such that the external magnets can be arranged, for example, so as to form rows which run parallel to the axis of rotation or, conversely, in offset arrangements. The size and number of external magnets are also variable, and are at least virtually unlimited.

By means of the magnets 3, 4, 5, 6 and 7, and specifically by the supply of the magnets 3, 4, 5, 6 and 7 with electrical energy, the external magnets respectively deliver magnetic fields, the respective flux of which can be influenced by the appropriate rotation of rings 10*a-e*.

From FIG. 2, it can be particularly clearly seen that the rotor 8 comprises a shaft 16 and a carrier 17, which is also described as a carrier element or a wing. The carrier 17, specifically above a toothing element 46, is non-rotationally connected to the shaft 16, such that the carrier 17 is co-rotatable with the shaft 16 about the primary axis of rotation. The toothing element 46 is, for example, non-rotationally connected to the shaft 16, wherein the toothing element 46 can be integrally configured with the shaft 16. Moreover, for example, the carrier 17 cooperates with the toothing element 46 in a form-fitted manner, such that the carrier 17, by means of the toothing element 46, is non-rotationally connected to the shaft 16. The rotor 8 further comprises at least one coil, which is not visible in the figures, which can be supplied with electric current or electrical energy. By the supply of the coil with electrical energy, electric current flows into the coil. The coil is at least indirectly, and specifically directly held on the carrier 17 and thus, by means of the carrier 17, is specifically non-rotationally connected to the shaft 16, such that the coil is co-rotatable with the shaft 16 about the primary axis of rotation, relative to the housing 9. Specifically, the coil is wound about at least one longitudinal region of the carrier 17, and is thus held on the carrier 17, such that the coil is co-rotatable with the carrier 17 about the primary axis of rotation, relative to the housing 9.

Figure 3:
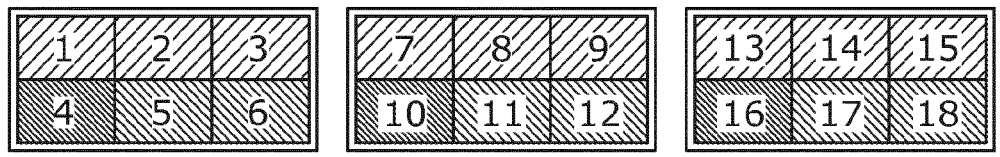
FIG. 3 is a schematic representation of a multi-control panel for the magnets of the electrical machine, which are configured as external magnets.
Figure 4:
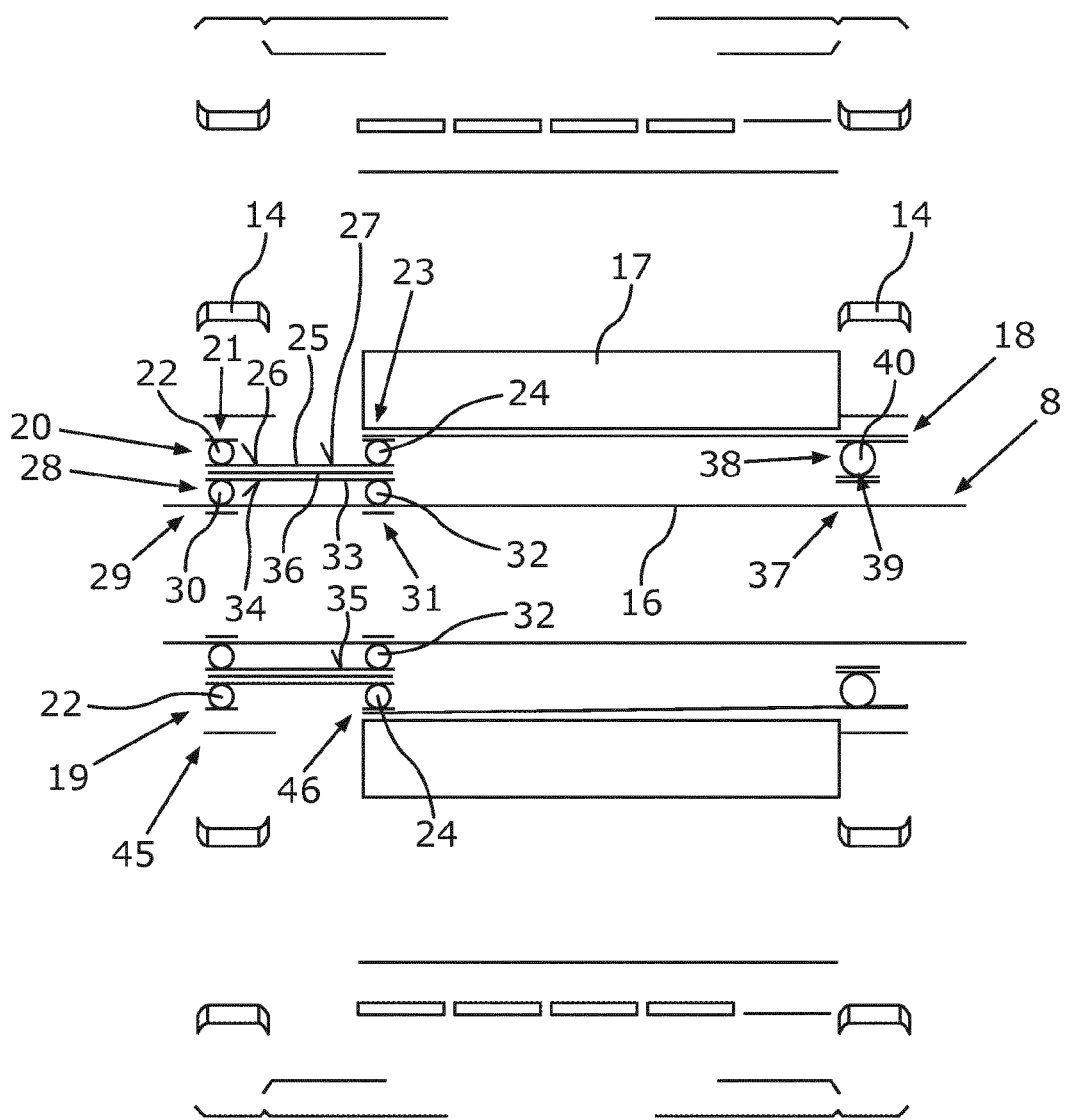
FIG. 4 is a sectional schematic view of the electrical machine according to the first embodiment, in a longitudinal section.

FIG. 3 shows a multi-control panel for the external magnets. With reference to FIG. 4, the supply of the coil with electric current is described hereinafter. The coil and the carrier 17 are, or respectively form a core of the electrical machine 1 for example. Specifically, the carrier 17 and the coil form a second electromagnet which—given that the electrical machine 1 is configured as an internal rotor machine—forms an internal magnet and—specifically by the supply of the second electromagnet with electrical energy—delivers at least a second magnetic field. Thus, for example, at least two voltage sources or two current sources are provided wherein, by means of a first of the voltage or current sources, the external magnets and, by means of the second voltage or current source, the internal magnet can be supplied with electrical energy or electric current. The external magnets and the internal magnet thus respectively deliver specifically at least two magnetic fields wherein, by the action of both fields, specifically by means of voltage and magnetic field, the speed of rotation of the rotor 8 can be appropriately adjusted.

The housing 9, also described as a shell or a jacket, is formed, for example, of ebonite or vulcanized rubber. Further materials for the jacket are, for example, glass or wood.

From FIG. 4, it can be seen that the rotor 8, by means of a rolling bearing which is identified overall by the number 18, is rotatably mounted on the stator 2, specifically on the bearing disks 14. The rolling bearing 18 comprises a first rolling bearing device 19, having a first series of rolling elements 20. The first series of rolling elements 20 comprises a first rolling element ring 21, having a plurality of mutually separately-configured first rolling elements 22, which are configured, for example, as spheres, arranged sequentially in the circumferential direction of the shaft 16. The first series of rolling elements 20 further comprises a second rolling element ring 23, which follows the first rolling element ring 21 in the axial direction of the shaft 16, having a plurality of second rolling elements 24 which are configured in a mutually separate manner per se and arranged sequentially in the circumferential direction of the shaft 16, and which are configured, for example, as spheres. The first series of rolling elements 20 further comprises a first bearing ring element 25, which forms a first raceway 26 for the first rolling elements 22, and a second raceway 27 for the second rolling elements 24. The bearing ring element 25 is, for example, an inner ring or an inner bearing ring.

The first rolling bearing device 19 further comprises a second series of rolling elements 28, comprising a third rolling element ring 29, which at least partially, specifically at least predominantly or completely inwardly overlaps the first rolling element ring 21 in the radial direction of the shaft 16, having a plurality of third rolling elements 30 arranged sequentially in the circumferential direction of the shaft, and which are configured, for example, as spheres. The second series of rolling elements 28 further comprises a fourth rolling element ring 31 following the third rolling element ring 29 in an axial direction of the shaft 16 and at least partially, specifically at least predominately or entirely inwardly overlapping the second rolling element ring 23 in the radial direction of the shaft 16, having a plurality of fourth rolling elements 32 which are configured in a mutually separate manner per se and are arranged sequentially in a circumferential direction of the shaft 16. The second series of rolling elements 28 further comprises a second bearing ring element 33, arranged in the radial direction of the shaft 16 between the first bearing ring element 25 and the third rolling elements 30, and between the first bearing ring element 25 and the fourth rolling elements 32, which forms a third raceway 34 for the third rolling elements 30, and a fourth raceway 35 for the fourth rolling elements 32. The bearing ring element 33 is configured, for example, as an external ring. The raceways 26 and 27 or 34 and 35 are, for example, formed by mutually separately configured and, for example, mutually spaced annular elements which are arranged sequentially in the axial direction, or by a one-piece annular element.

The first rolling bearing device 19 further comprises at least one insulating element 36 arranged in the radial direction between the series of rolling elements 20 and 28, specifically between the bearing ring elements 25 and 33, by means of which the series of rolling elements 20 and 28, and specifically the bearing ring elements 25 and 33, are electrically insulated from one another.

In at least one operating state of the electrical machine 1, the coil is supplied with electric current, such that electric current flows to the coil, for example via the series of rolling elements 20, specifically via the bearing ring element 25 and the rolling elements 24, and flows out of the coil via the series of rolling elements 28, specifically via the rolling elements 32 and the bearing ring element 33. Thus, for example, the series of rolling elements 20 is connected to a positive electric pole, and the series of rolling elements 28 is connected to a negative electric pole or to ground on the electrical machine 1. Specifically, it is contemplated that, in the at least one operating state, which is also described as a first operating state, the electric current flows from the series of rolling elements 20 to, and specifically through the carrier 17, and via the latter to the coil. It is preferably provided that the carrier 17 is electrically insulated from the shaft 16. Specifically, an electrically insulating layer is arranged in the radial direction between the carrier 17 and the toothing element 46, such that the carrier 17 is electrically insulated from the toothing element 46, and thus from the shaft 16.

The electric current can then flow through the coil, and flows, for example, from the coil via the shaft 16 to the series of rolling elements 28, and from the series of rolling elements 28 to the negative pole or to ground. To this end, for example, in the first embodiment, it is provided that the rolling bearing 18 comprises a second rolling bearing device 37, by means of which the rotor 8 is rotatably mounted on the stator 2, specifically on the bearing disks 14. The second rolling bearing device 37, in an axial direction of the shaft 16, is thus spaced from the first rolling bearing device 19, and comprises a third series of rolling elements 38, having a fifth rolling element ring 39, having a plurality of mutually separately configured fifth rolling elements 40, which are arranged sequentially in the circumferential direction of the shaft 16. In the first operating state, the coil is then supplied with electric current, such that the electric current flows out of the coil via the third series of rolling elements 38 or the fifth rolling element ring 39. The electric current flows from the coil to, and specifically through the series of rolling elements 38 or the rolling element ring 39, and from the latter via the shaft 16 to, and specifically through the series of rolling elements 28, and from the latter to the negative pole or to ground.

Alternatively or additionally, the electrical machine 1 assumes at least one second operating state, in which the coil is supplied with electric current in an inverse manner to the first operating state. The electric current, for example, specifically from the current source, flows to, and specifically through the series of rolling elements 28, and from the series of rolling elements 28 to, and specifically through the shaft 16. From the shaft 16, the electric current then flows to, and specifically through the series of rolling elements 38 to, and specifically through the rolling element ring 39, from which the electric current then flows, specifically, for example, via the carrier 17 to, and specifically through the coil. The electric current then flows through the coil, and from the coil to and through the series of rolling elements 20, from which the electric current then flows, for example, to the negative pole. Such a direction of flow of the electric current can thus be alternated, according to the operating state, and specifically alternates a number of times per second if, for example, an alternating voltage is applied to the coil, such that the coil is supplied with alternating current.

In other words, for the supply of the coil with electric current, an electric voltage is applied to the coil, specifically an alternating electric voltage, or a direct electric voltage. The electric voltage is applied to the side on which the rolling bearing device 19 is situated. The rolling bearing device 37 is situated on the opposing side.

Figure 6:
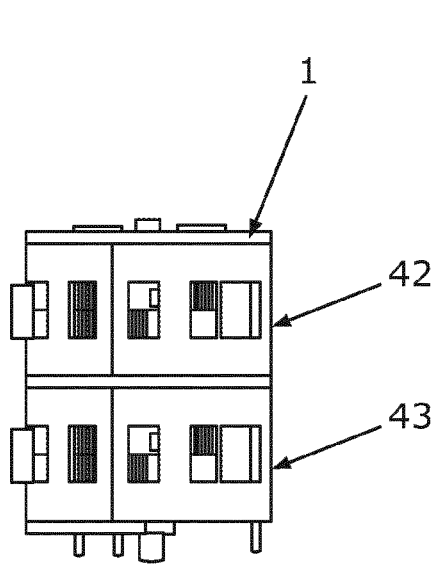
FIG. 6 is a schematic side view of the electrical machine according to a second embodiment.

FIG. 6 shows a schematic side view of a second embodiment of the electrical machine 1. In the second embodiment, two modules 41 and 42 of the electrical machine 1 are arranged in-circuit in an axial direction of the electrical machine 1, one after another or sequentially, and are specifically electrically connected to one another in series, or series-connected. The respective module 41 or 42, specifically the module 42 is configured, for example, as the electrical machine 1 according to the first embodiment. In other words, for example, the layout of the module 42 corresponds to the layout of the electrical machine 1 according to the first embodiment. In comparison with the electrical machine 1 according to the first embodiment, the module 41 features differences, which are addressed with reference to FIGS. 9 and 10.

Figure 7:
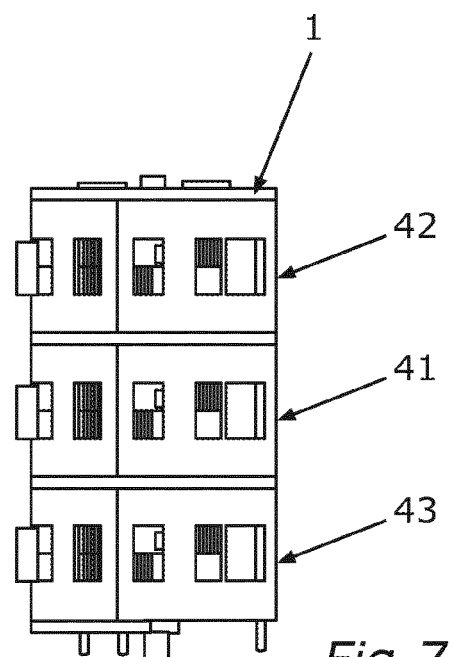
FIG. 7 is a schematic side view of the electrical machine according to a third embodiment.

FIG. 7 shows a third embodiment of the electrical machine 1. In the third embodiment, the electrical machine 1 comprises modules 41, 42 and 43 which are arranged one after another and are thus serially interconnected, wherein the modules 41, 42 and 43 are sequentially arranged in the axial direction, and are electrically connected to one another in series. The modules 41 and 43, for example, have an identical layout, which is addressed in greater detail in the context of the description of FIGS. 9 and 10.

Figure 8:
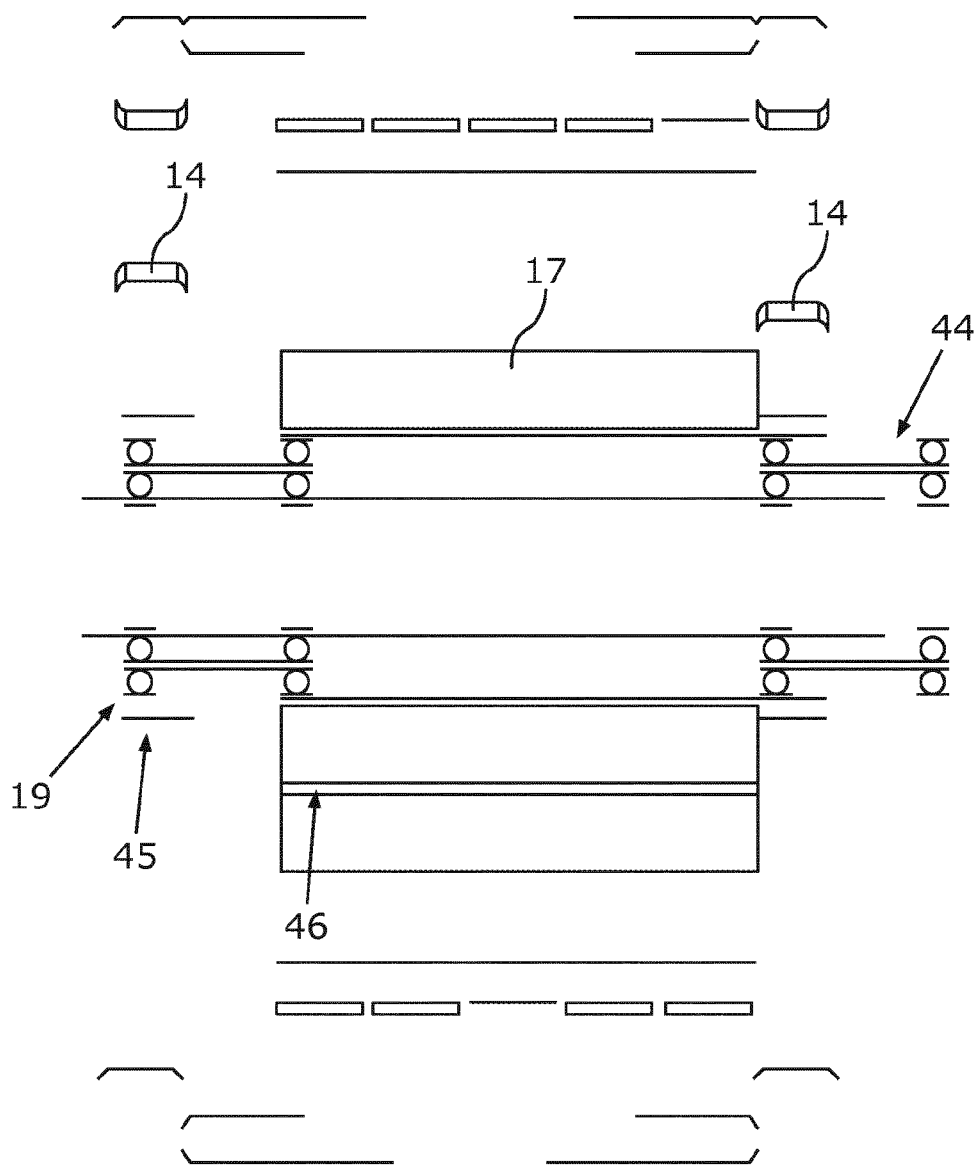
FIG. 8 is a sectional schematic side view of the electrical machine according to the second embodiment.

FIG. 8 shows a schematic longitudinal sectional view of the second embodiment, wherein the layout of the module 41, and thus of the module 43, can be seen from FIG. 8.

FIG. 9 shows the rolling bearing 18, which is employed in the first embodiment, and in the respective module 42 of the second and third embodiment. In the respective module 41 or 43, in place of the rolling bearing device 37, a third rolling bearing device 44 is employed, the layout of which corresponds to the layout of the rolling bearing device 19. The reason for this is that—in comparison with the first embodiment in which, for example, electric current only flows via the rolling bearing device 37 from the shaft 16 to the coil or vice versa—in the second and third forms of embodiment, the electric current is transmitted, for example, via the rolling bearing device 44 from the coil of the module 41 to the coil of the module 42, or from the coil of the module 43 to the coil of the module 41, or vice versa in each case. As already described with reference to the rolling bearing device 19, in an analogous manner, current can be transmitted via the rolling bearing device 44 from the coil of the module 41 to the coil of the module 42, or from the coil of the module 43 to the coil of the module 41 or, conversely, from the coil of the module 42 to the coil of the module 41, or from the coil of the module 41 to the coil of the module 43. In this manner, a plurality of modules can be arranged sequentially in the axial direction and mutually interconnected in series, in a simple, cost-effective and space-saving manner.

In order to permit, for example, the transmission of high forces or high torques on the shaft 16, which is specifically configured as a drive shaft or as an output shaft, the frame 13 is configured, for example, as a stable metal frame. A cable carrier for the moveable external magnets is fitted, for example, to the housing 9, which is also described as an outer housing, such that the respective cables of the cable carrier do not get trapped.

From FIG. 2, it can be seen that the carrier 17 is preferably configured in the form of a wing, and thus incorporates respective wing elements 45 which, for example, can be configured in arched shape, and here can be configured in the manner of a propeller. The wing elements 45 are configured, for example, such that they generate a self-cooling effect and, specifically where the rotor 8 is rotated about the primary axis of rotation, convey air in the form of cooling air or a cooling air stream, by means of which the electrical machine 1 can be cooled. Specifically, it is contemplated for the plurality of modules to be arranged in series, and coupled to the shaft 16.

Preferably, the insulating element 36 is configured as a semiconductor or an insulator. An intelligent control system can control the external magnets and the fields thereof, and can thus execute fine tuning. Moreover, an intelligent control system can control the coil or a magnetic field created by the coil, and can thus execute fine tuning. Both the voltage and the magnetic fields are measured continuously, specifically where necessary, in order to permit the achievement of fine adjustment.

LIST OF REFERENCE NUMBERS

1 Electrical machine
2 Stator
3 Magnet
4 Magnet
5 Magnet
6 Magnet
7 Magnet
8 Rotor
9 Housing
10a-e Ring
11a-e Toothing
12a-e Pinion
13 Frame
14 Bearing disk
15 Bearing shaft
16 Shaft
17 Carrier
18 Rolling bearing
19 First rolling bearing device
20 First series of rolling elements
21 First rolling element ring
22 First rolling elements
23 Second rolling element ring
24 Second rolling elements
25 First bearing ring element
26 First raceway
27 Second raceway
28 Second series of rolling elements
29 Third rolling element ring
30 Third rolling elements
31 Fourth rolling element ring
32 Fourth rolling elements
33 Second bearing ring element
34 Third raceway
35 Fourth raceway
36 Insulating element
37 Second rolling bearing device
38 Third series of rolling elements
39 Fifth rolling element ring
40 Fifth rolling elements
41 Module
42 Module
43 Module
44 Rolling bearing device
45 Wing element
46 Toothing element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical machine, comprising:
a stator having at least one first magnet and at least one second magnet; and
a rotor which is drivable by way of the first and second magnets and which is rotatable about an axis of rotation relative to the stator, wherein the first magnet is held on a first ring,
the second magnet is held on a second ring, which second ring follows the first ring in the axial direction of the electrical machine and is rotatable together with the second magnet about the axis of rotation relative to the first ring and the first magnet, and
the rotor comprises at least one shaft which is rotatable about the axis of rotation relative to the stator, and a coil which is at least indirectly connected to the shaft, and is co-rotatable with said shaft, and which is supplied with electric current;
at least one rolling bearing by which the rotor is rotatably mounted on the stator, the roller bearing comprising:
a first series of rolling elements, comprising a first rolling element ring with a plurality of first rolling elements arranged sequentially in the circumferential direction of the shaft, a second rolling element ring arranged subsequently to the first rolling element ring in an axial direction of the shaft and having a plurality of second rolling elements arranged sequentially in a circumferential direction of the shaft, and a first bearing ring element, which constitutes a first raceway for the first rolling elements and a second raceway for the second rolling elements;
a second series of rolling elements, comprising a third rolling element ring, which at least partially inwardly overlaps the first rolling element ring in the radial direction of the shaft and having a plurality of third rolling elements arranged sequentially in the circumferential direction of the shaft, a fourth rolling element ring arranged subsequently to the third rolling element ring in an axial direction of the shaft and at least partially inwardly overlapping the second rolling element ring in the radial direction of the shaft and having a plurality of fourth rolling elements arranged sequentially in a circumferential direction of the shaft, and a second bearing ring element arranged in the radial direction of the shaft between the first bearing ring element and the third rolling elements, and between the first bearing ring element and the fourth rolling elements, which constitutes a third raceway for the third rolling elements, and a fourth raceway for the fourth rolling elements; and
at least one insulating element arranged in the radial direction between the first and second series of rolling elements, by which the first and second series of rolling elements are electrically insulated from one another, wherein, in at least one operating state of the electrical machine, the coil is supplied with electric current such that said electric current flows to the coil via one of the first and second series of rolling elements, and flows from the coil via the other of the first and second series of rolling elements.

2. The electrical machine according to claim 1, wherein the first and second magnets are respectively configured as electromagnets, and are individually electrically actuatable.

3. The electrical machine according to claim 2, wherein the electrical machine has at least a first operating state, in which the electromagnets are supplied with alternating current.

4. The electrical machine according to claim 3, wherein the electrical machine has at least a second operating state, in which the electromagnets are supplied with direct current.

5. The electrical machine according to claim 1, wherein
at least three first magnets, held on the first ring, and at least three second magnets, held on the second ring, are provided, and
the first magnets and/or second magnets are arranged with an equal mutual spacing in the circumferential direction of the respective ring.

6. The electrical machine according to claim 1, wherein
the first rolling element ring and the third rolling element ring are arranged in a first longitudinal region of the rolling bearing device, wherein the first longitudinal region is configured in an overlap-free outward arrangement, in the radial direction, to the coil and/or to a carrier which is non-rotationally connected to the shaft, on which the coil is held; and
the second rolling element ring and the fourth rolling element ring are arranged in a second longitudinal region of the rolling bearing device, which is arranged in an axial direction of the shaft subsequently to the first longitudinal region, wherein the second longitudinal region, in the outward radial direction, is overlapped by the coil and/or by the carrier.

7. The electrical machine according to claim 6, wherein
the rotor is rotatably mounted on the stator by at least one second rolling bearing device, arranged in the axial direction of the shaft subsequently to the rolling bearing device and spaced from said rolling bearing device, which comprises a third series of rolling elements having a fifth rolling element ring with a plurality of fifth rolling elements which are arranged sequentially in a circumferential direction of the shaft, wherein, in the at least one operating state of the electrical machine, the coil is supplied with electric current in such a way that the electric current flows to or from the coil via the third series of rolling elements.

8. The electrical machine according to claim 7, wherein
in the at least one operating state of the electrical machine, the coil is supplied with electric current in such a way that the electric current flows to or from the coil via the shaft.

* * * * *